United States Patent
Matsuura et al.

(10) Patent No.: US 10,040,483 B2
(45) Date of Patent: Aug. 7, 2018

(54) VEHICLE REAR STRUCTURE

(71) Applicant: HONDA MOTOR CO., LTD., Tokyo (JP)

(72) Inventors: Norikazu Matsuura, Wako (JP); Chihiro Sakurada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/295,523

(22) Filed: Oct. 17, 2016

(65) Prior Publication Data
US 2017/0106912 A1 Apr. 20, 2017

(30) Foreign Application Priority Data
Oct. 19, 2015 (JP) ................. 2015-205543

(51) Int. Cl.
*B62D 21/15* (2006.01)
*B62D 25/02* (2006.01)
*B62D 27/02* (2006.01)
*B62D 25/20* (2006.01)
*B62D 27/06* (2006.01)

(52) U.S. Cl.
CPC ....... *B62D 21/155* (2013.01); *B62D 25/2027* (2013.01); *B62D 27/065* (2013.01); *B62D 25/025* (2013.01); *B62D 27/02* (2013.01)

(58) Field of Classification Search
CPC .......... B62D 21/155; B62D 25/025; B62D 25/2027; B62D 27/02; B62D 27/065
USPC ..................................... 296/187.11
See application file for complete search history.

(56) References Cited

U.S. PATENT DOCUMENTS

| 7,900,995 B2 * | 3/2011 | Sato ............... B62D 21/157 280/784 |
| 2012/0153579 A1 * | 6/2012 | Nakaoka ............. F16J 15/0818 277/644 |

FOREIGN PATENT DOCUMENTS

| JP | 3816418 B2 | 8/2006 |
| JP | 4559259 B2 | 10/2010 |

* cited by examiner

*Primary Examiner* — Joseph Pape
*Assistant Examiner* — Dana D. Ivey
(74) *Attorney, Agent, or Firm* — Westerman, Hattori, Daniels & Adrian, LLP

(57) ABSTRACT

A vehicle rear structure includes a side sill joined to a rear frame via an outrigger, a sub-frame mounted on the rear frame from below, and a fuel tank mounted on the sub-frame. The sub-frame is provided with a load transmitting member that opposes the outrigger. An impact load applied to the sub-frame is transmitted to the outrigger via the load transmitting member. The transmitted impact load is distributed to the two components, the rear frame (specifically, front frame section) and the side sill via the outrigger.

18 Claims, 8 Drawing Sheets

VEHICLE REAR STRUCTURE

CROSS REFERENCES TO RELATED APPLICATIONS

The present application claims priority under 35 U.S.C. § 119 to Japanese Patent Application No. 2015-205543, filed Oct. 19, 2015, entitled "Vehicle Rear Structure." The contents of this application are incorporated herein by reference in their entirety.

TECHNICAL FIELD

The present disclosure relates to a vehicle rear structure in which a rear frame extends rearward from a floor frame and in which a sub-frame is mounted on the rear frame from below.

BACKGROUND

There is known a vehicle rear structure in which a stack case for housing a fuel cell is provided below a front floor and in which a sub-frame is provided in the rear of the stack case. A hydrogen tank is provided on the sub-frame, while the sub-frame and the stack case have flat facing surfaces (see, for example, Japanese Patent No. 3816418).

When subjected to an impact load, the sub-frame comes into contact with the stack case. The impact load is transmitted from the sub-frame to the stack case. The transmitted impact load is dispersed on a whole surface of the stack case and is supported by the stack case. To ensure that the impact load is dispersed on the whole surface of the stack case and is supported by the stack case, it is necessary to enhance strength and rigidity of the stack case. However, the enhanced strength and rigidity will jeopardize efforts to reduce the weight of the vehicle.

There is also known another vehicle rear structure in which a sub-frame is mounted on a rear frame from below and in which a lower frame is provided in the rear of the sub-frame. The lower frame opposes the sub-frame (see, for example, Japanese Patent No. 4559259). When the rear frame is subjected to an impact load, the lower frame comes into contact with the sub-frame. The impact load is transmitted from the lower frame to the sub-frame that supports the impact load. However, for the sub-frame to support the impact load, it is necessary to mount the lower frame on the rear frame, which also jeopardizes efforts to reduce the weight.

SUMMARY

The present application describes, for example, a vehicle rear structure that can avoid a weight increase and can support an impact load.

A first aspect of the present application provides a vehicle in which a floor frame extends in the longitudinal direction of a vehicle and a rear frame extends rearward from the floor frame and a side sill is provided on the outer side in the vehicle-width direction of the floor frame and the side sill is joined to the rear frame via an outrigger and a sub-frame is mounted on the rear frame from below, which includes a load transmitting member that is provided on the sub-frame so as to oppose the outrigger in which an impact load applied to the sub-frame is transmitted to the outrigger via the load transmitting member and the transmitted impact load is distributed to the rear frame and the side sill via the outrigger.

As described above, the sub-frame is mounted on the rear frame from below and the load transmitting member is provided on the sub-frame. In addition, the load transmitting member opposes the outrigger. With this arrangement, an impact load applied to a rear end of the vehicle is transmitted to the load transmitting member via the sub-frame. The transmitted impact load is distributed to the rear frame and the side sill via the outrigger. Accordingly, the impact load applied to the rear end of the vehicle can be supported by the sub-frame, the rear frame, and the side sill. Supporting the impact load by the sub-frame can reduce or eliminate a deformation (or fracture) of the curved section of the rear frame caused by the impact load.

In addition, the simple configuration having the load transmitting member of the sub-frame opposing the outrigger enables the impact load to be supported by the rear frame and the side sill. Accordingly, unlike the Related Art, there is no need to enhance the strength and rigidity of a stack case or for installing a lower frame on the rear frame, thereby preventing an increase in weight of the vehicle rear structure.

A second aspect of the present application provides a vehicle rear structure in which preferably the outrigger may extend downward from a bottom of a front inclined portion of a curved section of the rear frame so as to oppose the load transmitting member and may extend in the vehicle-width direction from the bottom of the front inclined portion to the side sill.

As described above, the outrigger extends downward from the bottom of the front inclined portion of the curved section so as to oppose the load transmitting member. In addition, the outrigger extends in the vehicle-width direction from the bottom of the front inclined portion to the side sill. With this arrangement, when the load transmitting member is moved forward, the load transmitting member can come into contact with the rear end of the outrigger (more specifically, the rear wall). Accordingly, the impact load transmitted from the load transmitting member to the outrigger can be distributed to and supported by two components, the rear frame and the side sill.

A third aspect of the present application provides a vehicle rear structure in which preferably the outrigger may have a bulkhead provided thereinside that functions as a partition wall.

As described above, the bulkhead provided inside the outrigger enhances the strength and rigidity of the outrigger. This ensures reduction or prevention of deformation of a cross section of the outrigger resulting from the impact load transmitted from the load transmitting member to the outrigger. Accordingly, the impact load transmitted to the outrigger can be effectively distributed to the rear frame and the side sill.

A fourth aspect of the present application provides a vehicle in which the bulkhead may preferably be disposed between the rear frame and the side sill.

As described above, the bulkhead is disposed between the rear frame and the side sill. The floor panel is provided on the top of the rear frame and on the top of the side sill. This ensures that a height dimension between the top and bottom of the rear frame and a height dimension between the top and bottom of the side sill are made greater. Accordingly, due to being disposed between the rear frame and the side sill, the bulkhead can be made greater. This enhances the strength and rigidity of the outrigger, thereby further ensuring the reduction or prevention of deformation of the cross section of the outrigger resulting from the impact load.

A fifth aspect of the present application provides a vehicle rear structure in which the sub-frame may preferably be provided at a front end thereof with at least two fastening members in the longitudinal direction of the vehicle and in which the two fastening members may preferably be fastened to the rear frame.

When subjected to an impact load, the sub-frame has a bending moment occurring therein. For this reason, the bending moment is preferably supported by the fastening member. Therefore, at least two of the fastening members are provided at front ends of the sub-frame and are fastened to the rear frame. With this arrangement, the bending moment occurring in the sub-frame due to an impact load can be supported by the two fastening members. This ensures that the impact load applied to the sub-frame can be transmitted to the load transmitting member via the sub-frame in a stable manner (namely, effectively).

A sixth aspect of the present application provides a vehicle rear structure in which the rear frame may preferably be provided at a rear portion thereof with an energy absorbing member and in which preferably the energy absorbing member may have a bead that extends perpendicularly to the longitudinal direction of the rear portion of the rear frame.

As described above, the energy absorbing member is provided at the rear portion of the rear frame. The energy absorbing member, when subjected to an impact load in the event of a rear-end collision, is deformed (or collapses), thereby absorbing the impact load. This ensures that, after part of the impact load is absorbed by the energy absorbing member, the rest of the impact load can be transmitted to the load transmitting member via the sub-frame. As described above, the energy absorbing member absorbing part of the impact load enables the impact load to be supported in a more preferred manner.

A seventh aspect of the present application provides a vehicle rear structure in which, in the sub-frame, the rear frame and the fastening members may preferably be disposed on an extension line of the floor frame and in which the load transmitting member may preferably be provided on the front of the fastening member and project to the outer side of the fastening member along the outrigger.

As described above, the load transmitting member projects to the outer side of the fastening member along the outrigger. With this arrangement, a region of the load transmitting member opposing the outrigger can be made greater, thereby enabling the impact load to be effectively transmitted to the outrigger.

An eighth first aspect of the present application provides a vehicle rear structure in which preferably the outrigger extending downward from the bottom of the front inclined portion of the curved section may cause the front inclined portion and the outrigger to form a load receiving recess and in which a transmitting projection to be fitted into the load receiving recess may preferably be provided on the load transmitting member.

As described above, a load receiving recess is formed by the front inclined portion of the curved section and the outrigger. In addition, a transmitting projection to be fitted into the load receiving recess is provided on the load transmitting member. When the load transmitting member is moved forward due to an impact load, the transmitting projection can be fitted into the load receiving recess. With this arrangement, the transmitting projection can be held in a stable manner by the two components, the front inclined portion of the curved section and the outrigger. This ensures that the impact load can be stably transmitted from the load transmitting member to the outrigger, thereby supporting the impact load in a more preferred manner.

BRIEF DESCRIPTION OF THE DRAWINGS

The advantages of the disclosure will become apparent in the following description taken in conjunction with the following drawings.

DETAILED DESCRIPTION

Figure 1:
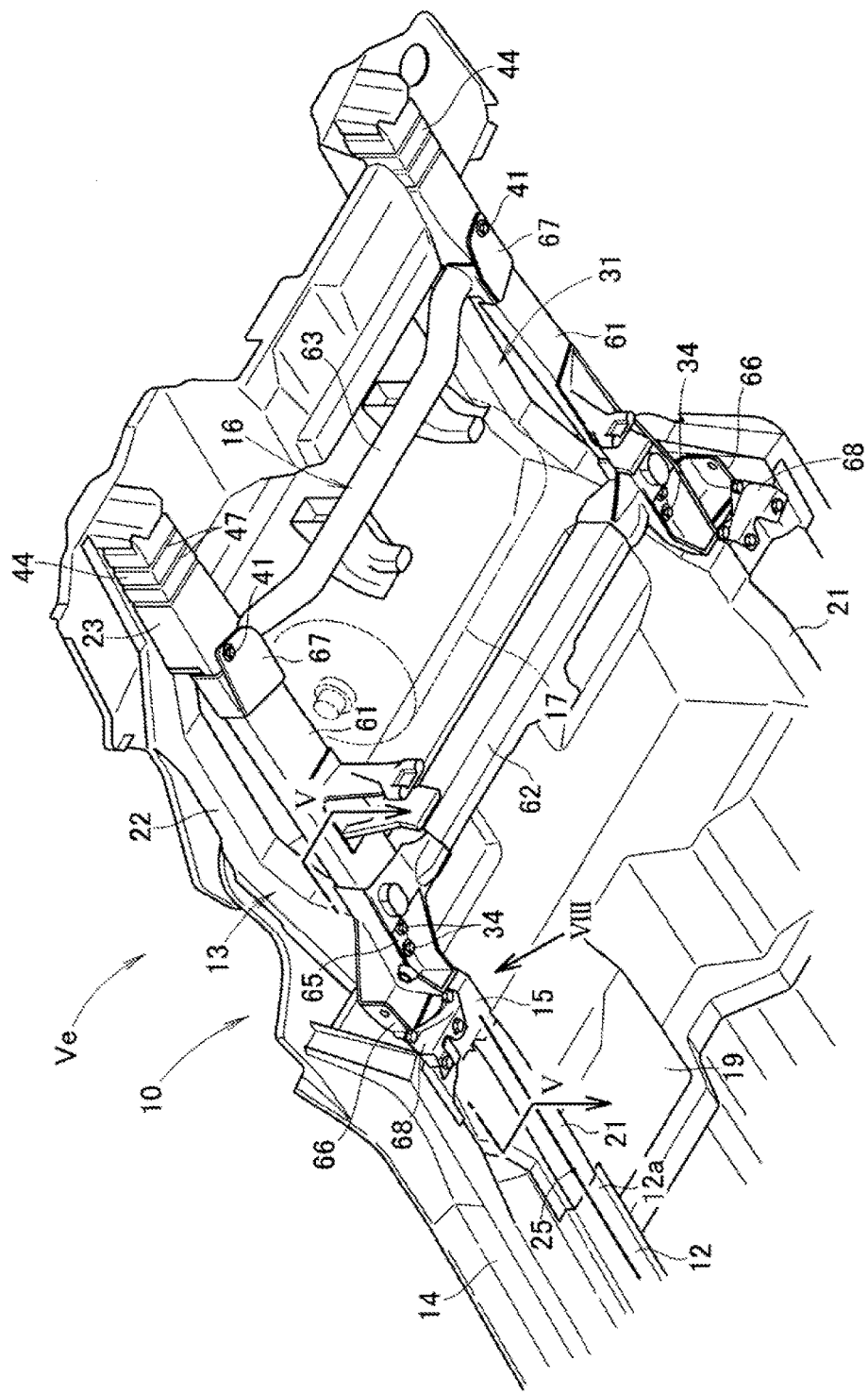
FIG. 1 is a perspective view of a vehicle rear structure according to an embodiment of the present application.

A preferred embodiment of the present application will be described below with reference to the attached drawings. In this description, references to "front (Fr)", "rear (Rr)", "right (R)", and "left (L)" are relative to the operator's position in the driver's seat of a vehicle.

A vehicle lower structure 10 according to the embodiment will be described below. The vehicle lower structure 10 exhibits substantially bilateral symmetry. Accordingly, the same reference numerals and symbols are assigned to right-side and left-side components of the vehicle lower structure 10, and a detailed description of the left-side components is provided while a description of the right-hand components is omitted in this description.

Figure 2:
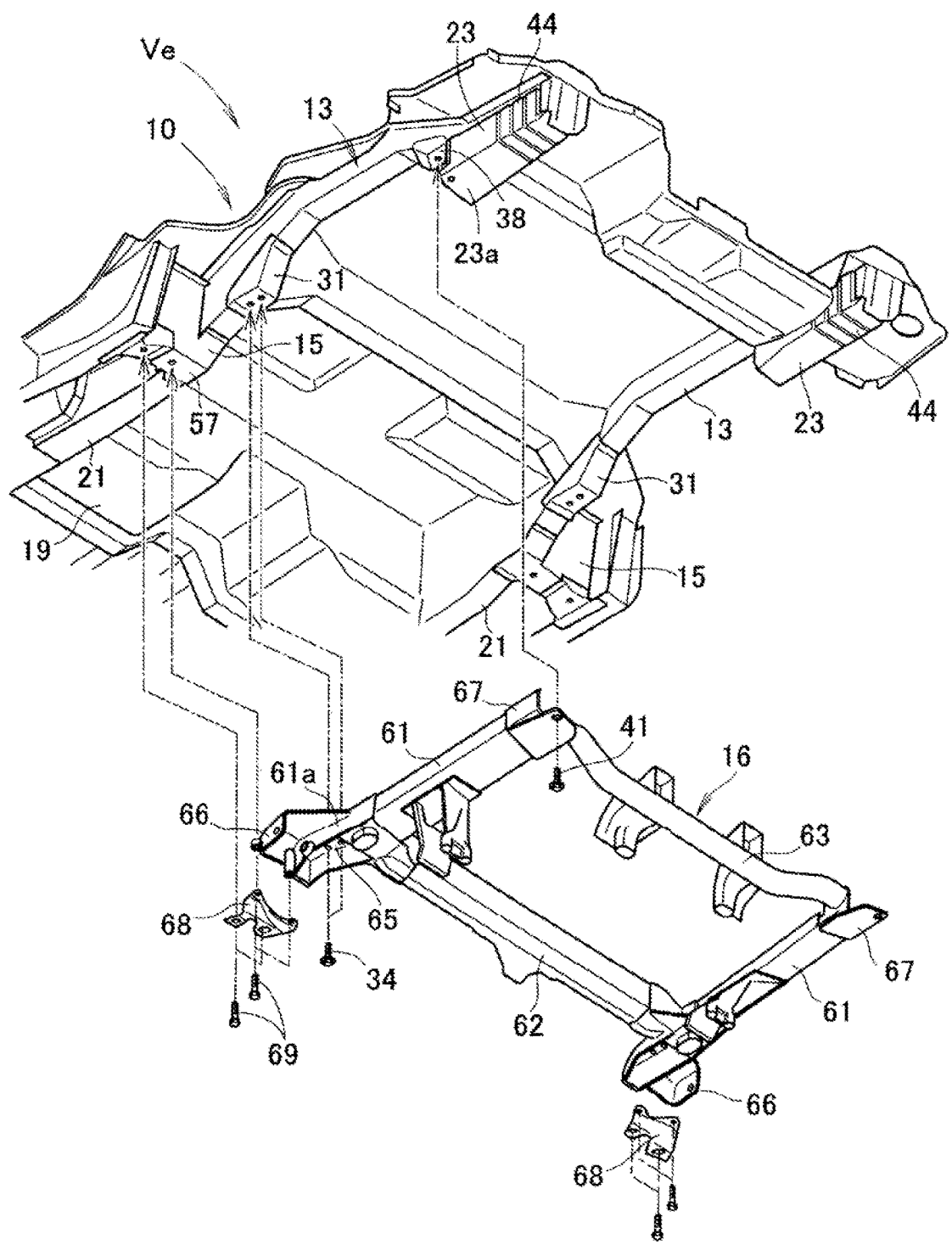
FIG. 2 is an exploded perspective view of a vehicle rear structure of FIG. 1.

Examples of the vehicle rear structure 10 include a vehicle rear structure of a fuel cell vehicle Ve shown in FIGS. 1 and 2. The vehicle rear structure 10 includes a floor frame 12 extending in the longitudinal direction of the vehicle, a rear frame 13 extending rearward from the floor frame 12, a side sill 14 provided on the outer side in the vehicle-width direction of the floor frame 12, an outrigger 15 connecting the side sill 14 and the rear frame 13, a sub-frame 16 joined to the rear frame 13 from below, and a fuel tank 17 mounted on the sub-frame 16.

The vehicle rear structure 10 is applied to the fuel cell vehicle Ve in which the fuel tank 17 consists of a hydrogen tank. A floor panel 19 is joined to an upper portion of the floor frame 12, thereby causing the floor panel 19 to be supported by the floor frame 12.

Figure 3:
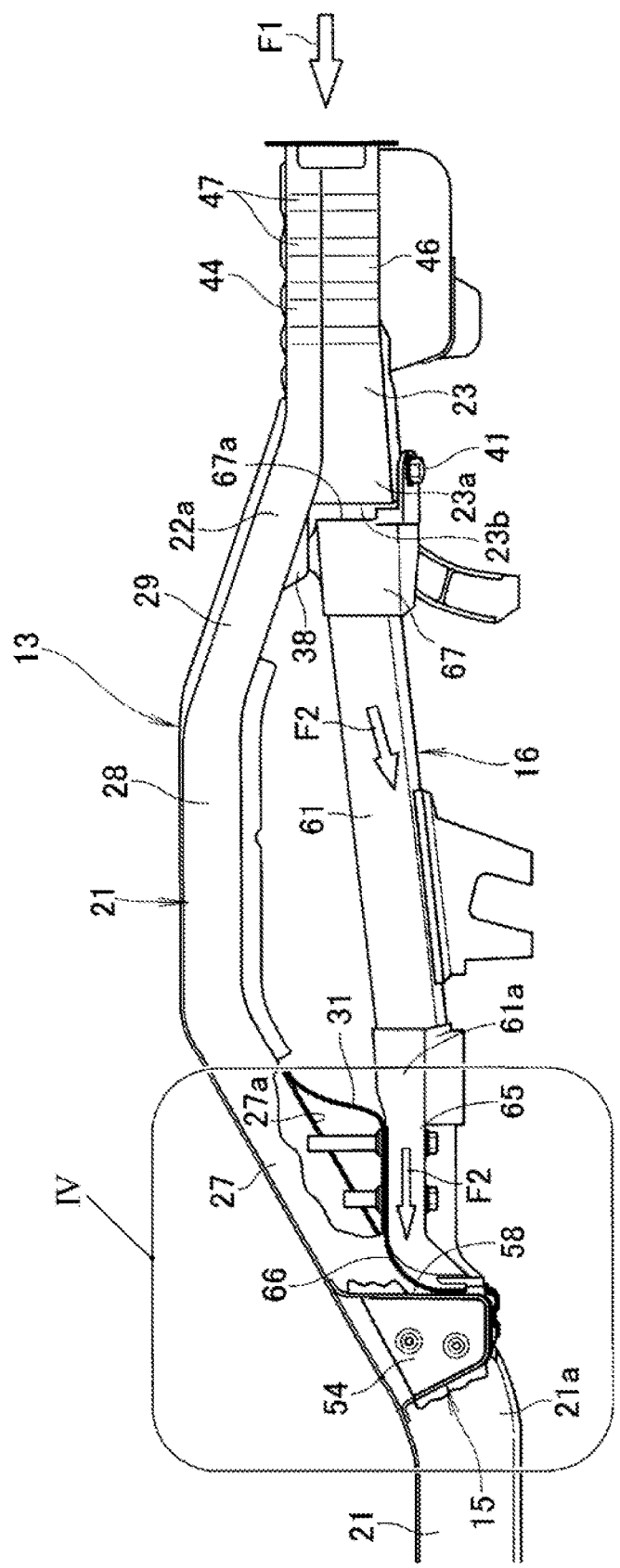
FIG. 3 is a side view of a vehicle rear structure of FIG. 1.

As shown in FIG. 3, the rear frame 13 includes a front frame section 21 extending rearward from a rear end 12*a* (see FIG. 1) of the floor frame 12, a curved section 22 joined to a rear end 21*a* of the front frame section 21, and a rear frame section 23 (or the rear section of the rear frame) joined to a rear end 22*a* of the curved section 22.

The front frame section 21 extends rearward from the rear end 12*a* of the floor frame 12 so as to be disposed on an extension 25 (see FIG. 1) of the floor frame 12. The curved section 22 is joined to the rear end 21*a* of the front frame section 21. The curved section 22 is formed so as to curve upward in the middle in the longitudinal direction of the rear frame 13. More specifically, the curved section 22 includes a front inclined portion 27 that extends rearward so as to be inclined upward from the rear end to a top portion 28 of the front frame section 21 and a rear inclined portion 29 that extends rearward so as to be inclined downward from the top portion 28 of the curved section 22 to the rear frame section 23 (or the rear section of the rear frame).

Figure 4:
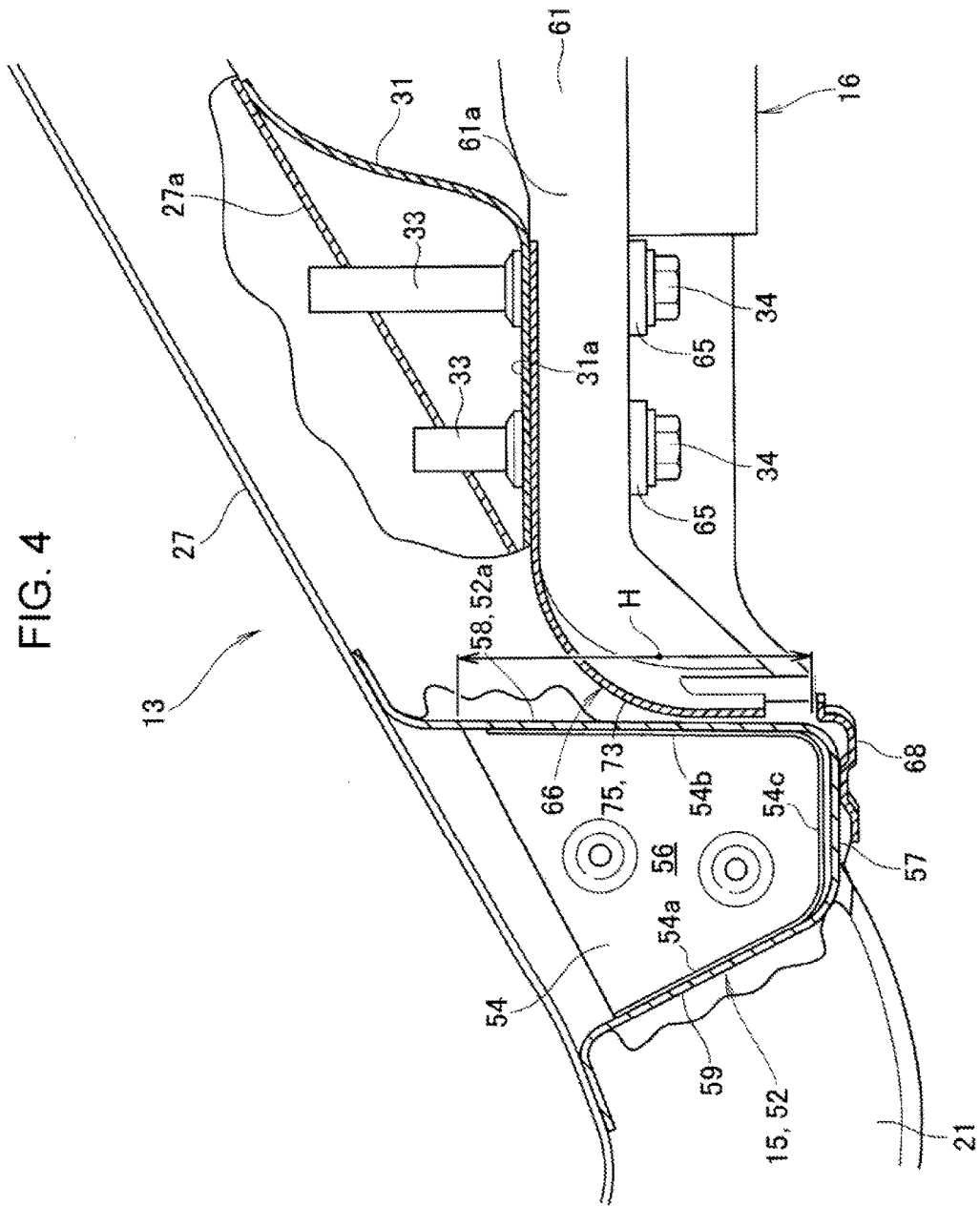
FIG. 4 is an enlarged view of part of a vehicle lower structure indicated by IV of FIG. 3.
Figure 5:
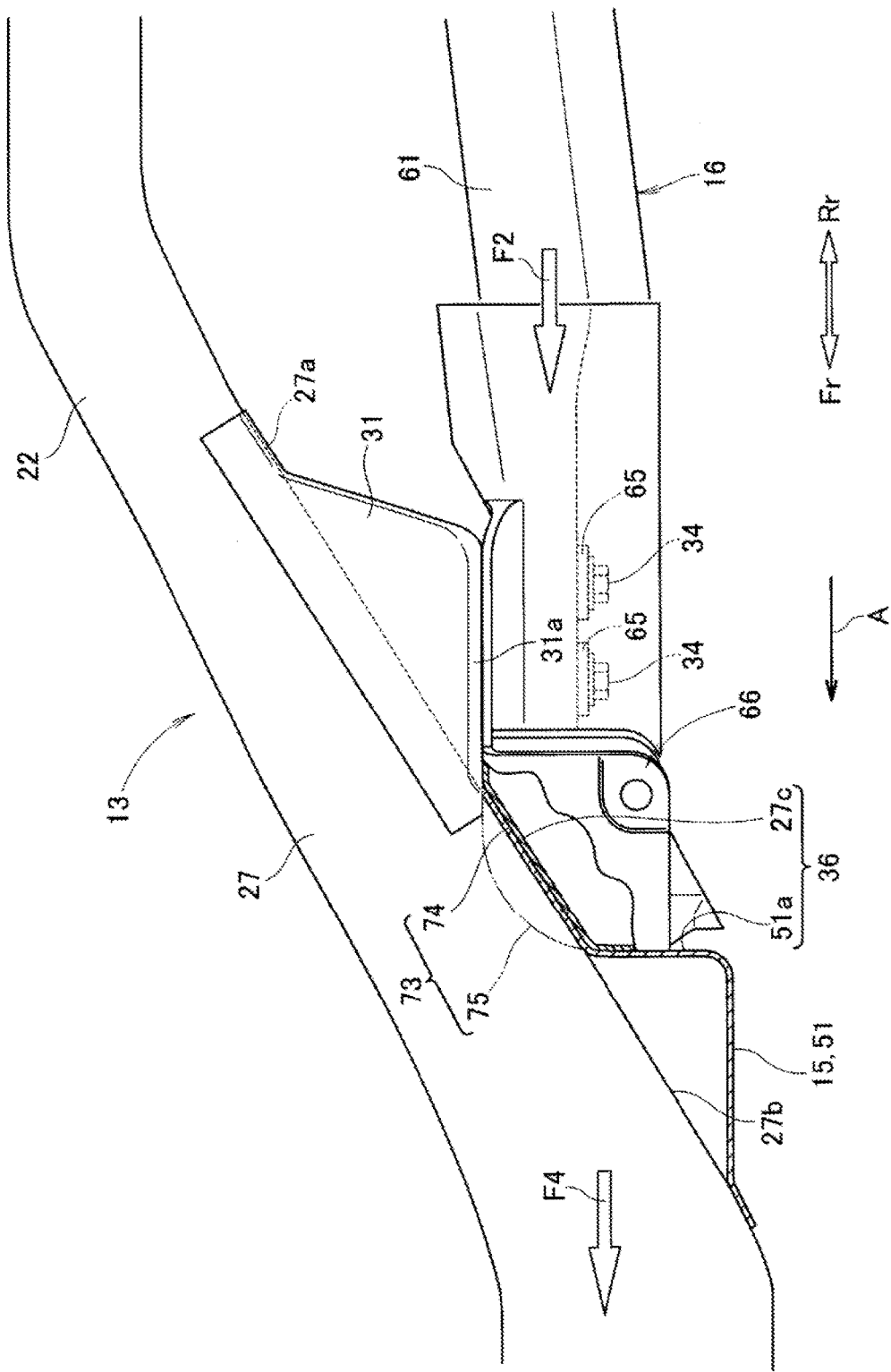
FIG. 5 is a sectional view taken along line V-V of FIG. 1.

As shown in FIGS. 4 and 5, a front mounting bracket 31 extends downward from a center bottom 27*a* of the front inclined portion 27. The front mounting bracket 31 has a flat bottom 31*a*. The bottom 31*a* of the front mounting bracket 31 and the center bottom 27*a* of the front inclined portion 27 as a unit have two nuts 33. The two nuts 33 are spaced apart in the longitudinal direction of the vehicle. Front fastening members 65 (fastening portions) of the sub-frame 16 are fastened to the two nuts 33 with bolts 34.

The outrigger 15 is provided in front of the front mounting bracket 31. In other words, the outrigger 15 extends downward from a front bottom 27*b* of the front inclined portion 27 (or the bottom of the front inclined portion). Of the front bottom 27*b* of the front inclined portion 27, a portion between the outrigger 15 and the front mounting bracket 31 is hereinafter referred to as a receiving portion 27*c*. A load receiving recess 36 is formed substantially in a V shape, when viewed in side view, by the receiving portion 27*c* and a rear wall 51*a* of an inner outrigger portion 51.

As shown in FIG. 3, a rear mounting bracket 38 is mounted on a rear end 22*a* of the rear inclined portion 29 (namely, the rear end of the curved section 22). In addition, a front end 23*a* of the rear frame section 23 is provided on the bottom surface of the rear end 22*a* of the curved section 22. A rear fastening member 67 of the sub-frame 16 is fastened to the rear mounting bracket 38 and the front, end 23*a* of the rear frame section 23 with bolts 41 (only one bolt illustrated). With this arrangement, a rear surface 67*a* of the sub-frame 16 (specifically, the rear fastening member 67) opposes a front surface 23*b* of the rear frame section 23.

An energy absorbing member 44 is provided on the rear frame section 23. The energy absorbing member 44 consists of a plurality of beads 47 formed on peripheral walls (specifically, an inner wall, an outer wall, and a bottom) of the rear frame section 23. The beads 47 extend perpendicularly to the longitudinal direction of the rear frame 13. With this arrangement, the energy absorbing member 44, when subjected to an impact load F1 in the event of a rear-end collision, is deformed (or collapses), thereby absorbing part of the impact load F1.

Figure 6:
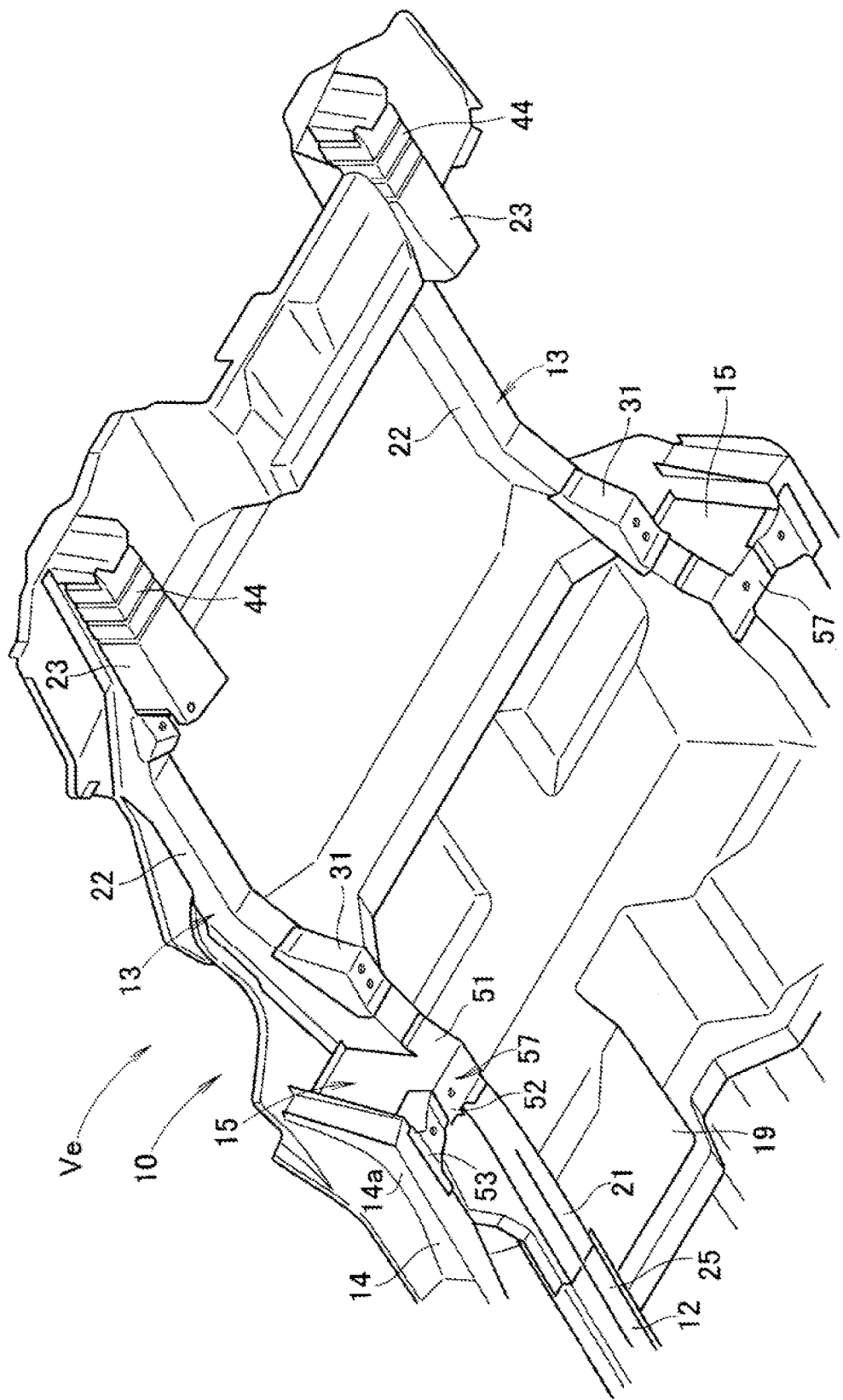
FIG. 6 is a perspective view of a vehicle rear structure of FIG. 2.

As shown in FIG. 6, the front bottom 27*b* of the front inclined portion 27 of the rear frame 13 is joined to a rear end 14*a* of the side sill 14 at the outrigger 15. With this arrangement, the side sill 14 is disposed on the outer side in the vehicle-width direction of the front frame section 21 of the rear frame 13 and the floor frame 12. In addition, the side sill 14 is disposed substantially in parallel to the front frame section 21 and the floor frame 12.

Figure 7:
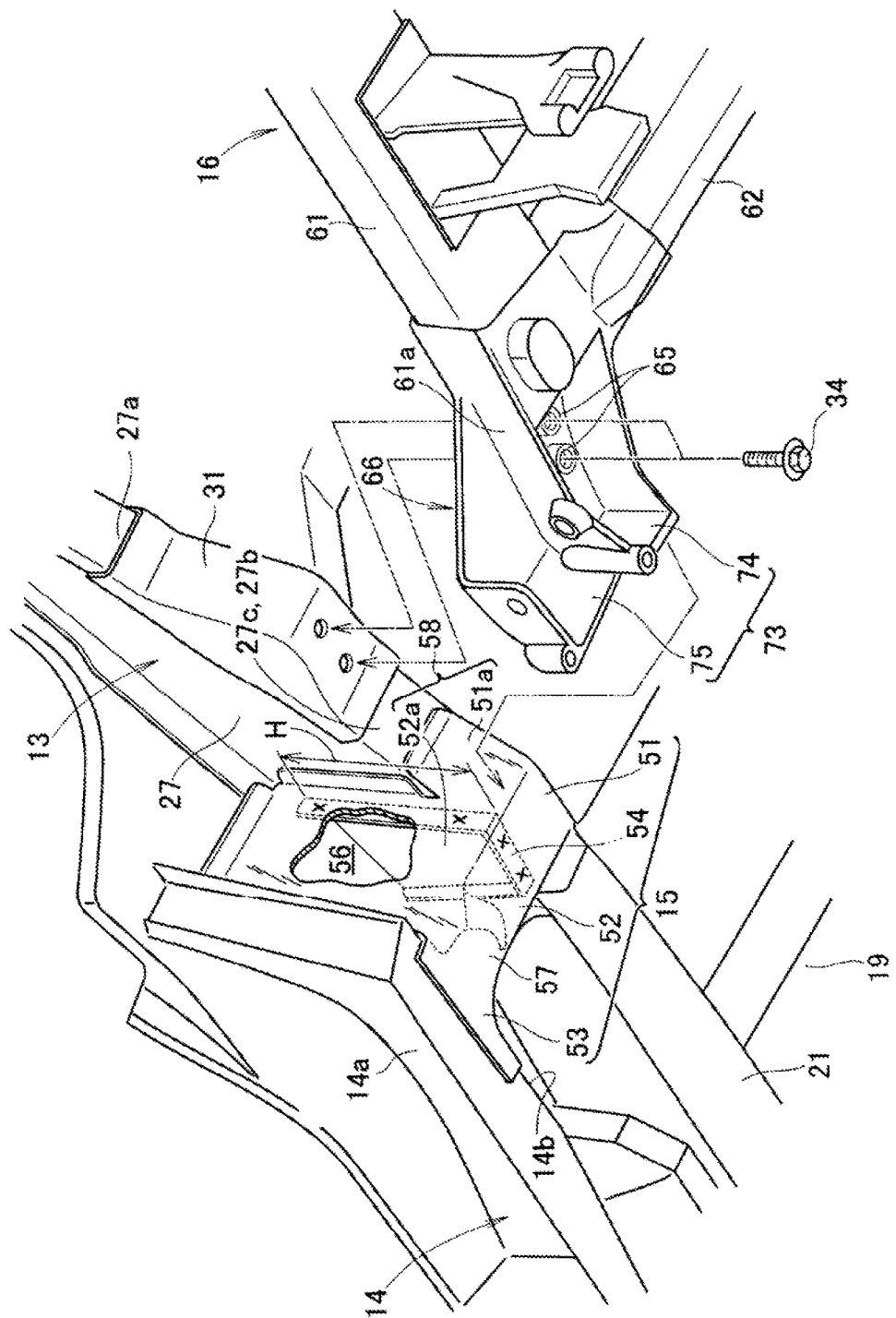
FIG. 7 is an exploded perspective view of an outrigger and a load transmitting member of FIG. 2.

As shown in FIGS. 4 and 7, the outrigger 15 includes an inner outrigger portion 51 projecting downward from the front bottom 27*b* of the front inclined portion 27, a middle outrigger portion 52 extending outward in the vehicle-width direction from the inner outrigger portion 51 to the rear end 14*a* of the side sill 14, an outer outrigger portion 53 that is joined to both an outer end of the middle outrigger portion 52 and the rear end 14*a* (specifically, an inner wall 14*b*) of the side sill 14, and a bulkhead 54 provided in an inner portion 56 of the outrigger 15.

With the outrigger 15 joined to both the front bottom 27*b* of the front inclined portion 27 and the rear end 14*a* of the side sill 14, a bottom 57 of the outrigger 15 is disposed so as to be substantially flush with bottoms of the side sill 14 and front frame section 21. With the inner outrigger portion 51 projecting downward from the front bottom 27*b* of the front inclined portion 27, the rear wall 51*a* of the inner outrigger portion 51 and a rear wall 52*a* of the middle outrigger portion 52 are disposed so as to oppose a load transmitting member 66 of the sub-frame 16.

The presence of the bulkhead 54 in the inner potion 56 of the outrigger 15 causes a partition wall to be created inside the middle outrigger portion 52. More specifically, a front flange 54*a*, a rear flange 54*b*, and a lower flange 54*c* of the bulkhead 54 are joined to a front wall 59, a rear wall 58, and a bottom 57 of the outrigger 15, respectively. With this arrangement, the bulkhead 54 is disposed between the rear frame 13 (specifically, the front bottom 27*b* of the front inclined portion 27) and the rear end 14*a* of the side sill 14.

This arrangement ensures that the rear frame 13 (or the front inclined portion 27) and the side sill 14 (or the rear end 14*a*) have greater height dimensions. Accordingly, due to being disposed between the front inclined portion 27 and the rear end 14*a*, the bulkhead 54 (particularly, height dimension H) is made greater. With this arrangement, the bulkhead 54 enhances the strength and rigidity of the outrigger 15.

As shown in FIG. 2, the sub-frame 16 is mounted on the rear frame 13 from below. The sub-frame 16 is formed substantially in the shape of a rectangular frame, when seen in plan view, by right and left longitudinal frame members 61, 61, a front coupling member 62, and a rear coupling member 63. In addition, the sub-frame 16 includes the front fastening member 65 provided at a front end 61*a* of the left longitudinal frame member 61 (or a front end of the sub-frame), the load transmitting member 66 provided on the front of the front fastening member 65, and the rear fastening member 67 provided on the rear of the left longitudinal frame member 61. Specifically, the front fastening member 65 and the load transmitting member 66 are formed in an integral manner.

The front fastening member 65 of the sub-frame 16 is fastened to the front mounting bracket 31 of the rear frame 13 with the two bolts 34. In addition, the rear fastening member 67 of the sub-frame 16 is fastened to the rear mounting bracket 38 of the rear frame 13 and the front end 23*a* of the rear frame section 23 with the bolts 41 (only one bolt illustrated).

With this arrangement, the sub-frame 16 is joined to the rear frame 13 from below. With the sub-frame 16 joined to the rear frame 13, a holding bracket 68 is fastened to the load transmitting member 66 and the bottom 57 of the outrigger 15 with bolts 69. This ensures that the load transmitting member 66 is held by the outrigger 15 in a preferred manner.

As shown in FIG. 3, with this arrangement, the rear surface 67*a* of the left longitudinal frame member 61 (specifically, the rear fastening member 67) of the sub-frame 16 is disposed so as to oppose the front surface 23*b* of the rear frame section 23. In addition, the left longitudinal frame member 61 is disposed on a line extending from the rear frame section 23. Accordingly, in the event of a rear-on collision, an impact load F1 applied to the rear frame section 23 is transmitted as an impact load F2 to the rear surface 67*a* of the rear fastening member 67 via the rear frame section 23 (namely, the energy absorbing member 44). The impact load F2 transmitted to the rear surface 67*a* of the rear fastening member 67 is transmitted to the load transmitting member 66 via the left longitudinal frame member 61.

Figure 8:
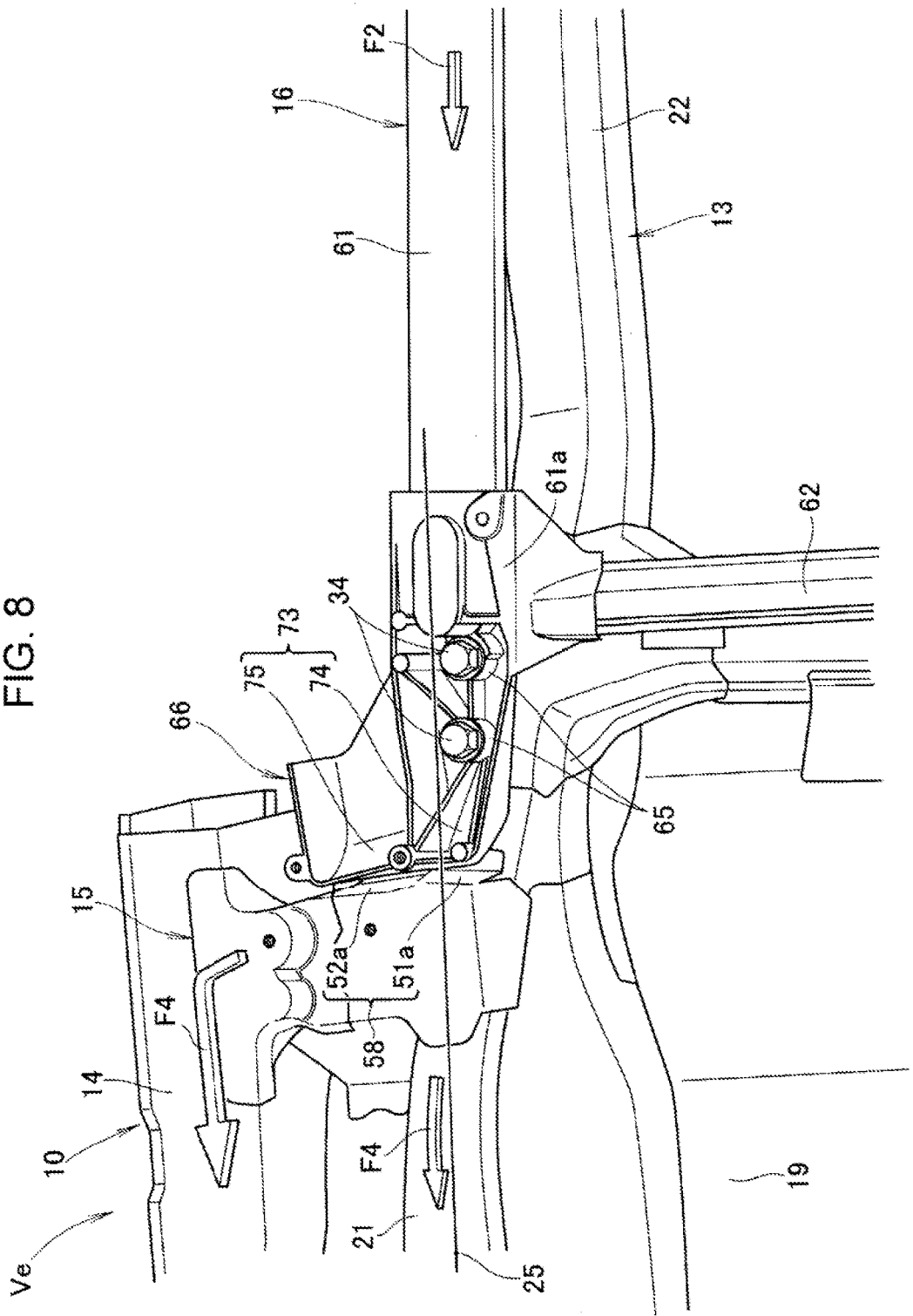
FIG. 8 is a perspective view as seen from an arrow VIII of FIG. 1.

As shown in FIGS. 4 and 8, the left longitudinal frame member 61 of the sub-frame 16 is provided at the front end 61*a* thereof with the front fastening member 65 and the load transmitting member 66. Two of the front fastening members 65 are provided at the front end 61a of the left longitudinal frame member 61 so as to be spaced apart from each other in the longitudinal direction. The front fastening members 65 are fastened to the front mounting bracket 31 with the bolts 34 and nuts 33. With this arrangement, the front frame section 21 of the rear frame 13 is disposed on the extension 25 of the floor frame 12 (see FIG. 1). In addition, the front fastening members 65 are disposed on the extension 25 of the floor frame 12.

Accordingly, part of the impact load F2 transmitted from the left longitudinal frame member 61 to the front fastening members 65 can be transmitted to the front frame section 21 of the rear frame 13 via the front fastening members 65. In addition, the impact load transmitted to the front frame section 21 can be transmitted to the floor frame 12. As a result, part of the impact load F2 can be supported by the front frame section 21 of the rear frame 13 and the floor frame 12.

At this time, the sub-frame 16 has a bending moment (particularly, horizontal bending moment) resulting from the impact load F2 applied to the rear end of the left longitudinal frame member 61. For this reason, the bending moment is preferably supported by the front fastening members 65.

Therefore, the two front fastening members 65 are provided so as to be spaced apart in the longitudinal direction and are fastened to the front mounting bracket 31, whereby the two front fastening members 65 are used to bear the bending moment of the sub-frame 16 resulting from the impact load F2. With this arrangement, the impact load F2 applied to the left longitudinal frame member 61 can be transmitted to the load transmitting member 66 via the left longitudinal frame member 61 in a stable manner (namely, effectively).

As shown in FIGS. 5 and 8, the load transmitting member 66 is provided in front of the front fastening members 65. The load transmitting member 66 projects outward from the front fastening member 65 along the rear wall 58 of the outrigger 15 and is provided at a rear end thereof with a transmitting projection 73. The transmitting projection 73 includes an inner projection 74 opposing the rear wall 51a of the inner outrigger portion 51 and an outer projection 75 opposing the rear wall 52a of the middle outrigger portion 52.

The inner projection 74 is formed substantially in a V shape, when viewed in cross-sectional view, so as to match with the load receiving recess 36 (namely, the receiving portion 27c and the rear wall 51a of the inner outrigger portion 51). The outer projection 75 is formed in a curved shape (indicated by two-dot chain lines in FIG. 5), when seen in cross-sectional view, to match with the rear wall 52a of the middle outrigger portion 52.

More specifically, with the front fastening member 65 fastened to the front mounting bracket 31, the inner projection 74 of the transmitting projection 73 is disposed so as to oppose the load receiving recess 36. In addition, the outer projection 75 of the transmitting projection 73 is disposed so as to oppose the rear wall 52a of the middle outrigger portion 52. In other words, the transmitting projection 73 is disposed so as to oppose the rear wall 58 of the outrigger 15.

Accordingly, an impact load applied to the rear end of the fuel cell vehicle Ve is transmitted as the impact load F2 to the load transmitting member 66 via the left longitudinal frame member 61 of the sub-frame 16. The transmitted impact load F2 is transmitted to the rear wall 58 (namely, the rear wall 51a of the inner outrigger portion 51 and the rear wall 52a of the middle outrigger portion 52) of the outrigger 15 via the load transmitting member 66.

The impact load F2 transmitted to the rear wall 58 of the outrigger 15 is distributed via the outrigger 15 to the front frame section 21 of the rear frame 13 as load F3 and to the side sill 14 as load F4. The load F3 distributed to the front frame section 21 of the rear frame 13 is transmitted to the floor frame 12 via the front frame section 21.

Accordingly, the impact load applied to the rear end of the fuel cell vehicle Ve is supported by the left longitudinal frame member 61 of the sub-frame 16, the front frame section 21 of the rear frame 13, the floor frame 12, and the side sill 14. As described above, supporting the impact load F2 transmitted to the sub-frame 16 by the left longitudinal frame member 61 of the sub-frame 16 can reduce or eliminate a deformation (or fracture) of the curved section 22 of the rear frame 13 caused by the impact load.

In addition, the simple configuration having the left longitudinal frame member 61 of the sub-frame 16 opposing the outrigger 15 enables the impact load F2 to be supported by the front frame section 21 of the rear frame 13, the floor frame 12, and the side sill 14. Accordingly, unlike the Related Art, there is no need to enhance the strength and rigidity of a stack case or for installing a lower frame on the rear frame 13, thereby preventing an increase in weight of the vehicle rear structure 10 (namely, the fuel cell vehicle Ve).

Furthermore, as shown in FIG. 7, the bulkhead 54 provided in the inner potion 56 of the outrigger 15 is disposed between the rear frame 13 (specifically, the front bottom 27b of the front inclined portion 27) and the rear end 14a of the side sill 14. With this arrangement, the bulkhead 54 (particularly, height dimension H) is made greater, thereby enhancing the strength and rigidity of the outrigger 15.

This ensures reduction or prevention of deformation of a cross section of the outrigger 15 resulting from the impact load transmitted to the outrigger 15 from the load transmitting member 66. As described above, the reduction or prevention of deformation of a cross section of the outrigger 15 allows the impact load transmitted to the outrigger 15 to be effectively distributed to the two members, the front frame section 21 of the rear frame 13 and the side sill 14.

In addition, the load transmitting member 66 projects outward from the front fastening member 65 along the rear wall 58 of the outrigger 15. More specifically, the outer projection 75 of the transmitting projection 73 of the load transmitting member 66 projects outward from the front fastening member 65 along the rear wall 52a of the middle outrigger portion 52. With this arrangement, the transmitting projection 73 of the load transmitting member 66 opposing the rear wall 58 of the outrigger 15 is made greater, thereby enabling the impact load to be effectively transmitted from the load transmitting member 66 to the outrigger 15.

As shown in FIG. 5, with the load transmitting member 66 disposed so as to oppose the rear wall 51a of the inner outrigger portion 51 and the rear wall 52a of the middle outrigger portion 52, the inner projection 74 of the transmitting projection 73 is fitted into the load receiving recess 36. With this arrangement, when the load transmitting member 66 is moved forward by the impact load F2 as indicated by an arrow A, the inner projection 74 of the transmitting projection 73 can be fitted into the load receiving recess 36.

This ensures that the inner projection 74 (namely, the transmitting projection 73) is held in a stable manner by the two members, the receiving portion 27c of the front inclined portion 27 and the rear wall 51a of the inner outrigger portion 51. Making the transmitting projection 73 stable enables the impact load F2 to be transmitted in a stable manner from the load transmitting member 66 to the outrigger 15.

As shown in FIG. 6, transmitting the impact load F2 in a stable manner from the load transmitting member 66 to the outrigger 15 enables the transmitted impact load F2 to be stably distributed to the front frame section 21 of the rear frame 13 and the side sill 14 via the outrigger 15, thereby supporting the impact load F2 in a more preferred manner.

As shown in FIG. 3, the energy absorbing member 44 is provided on the rear frame section 23 of the rear frame 13. With this arrangement, the energy absorbing member 44, when subjected to an impact load F1 in the event of a rear-end collision, is deformed (or collapses), thereby absorbing the impact load F1. Accordingly, after part of the impact load F1 is absorbed by the energy absorbing member 44, the rest of the impact load F2 can be transmitted to the load transmitting member 66 via the sub-frame 16. As described above, the energy absorbing member 44 absorbing part of the impact load F1 enables the impact load F2 to be supported in a more preferred manner.

The present application is typically described with reference to, but not limited to, the foregoing embodiment. Various modifications are conceivable within the scope of the present application. Although, in the embodiment described above, the vehicle rear structure 10 is applied to the fuel cell vehicle Ve having a hydrogen tank as a fuel tank, its application is not limited to this. The vehicle rear structure 10 can be applied to, for example, a vehicle provided with a conventional gasoline engine. In addition, although the two front fastening members 65 are provided on the front end 61a of the left longitudinal frame member 61 in the embodiment described above, three or more of the front fastening members 65 can be provided.

Furthermore, the shapes and configurations of the vehicle rear structure, the floor frame, the rear frame, the side sill, the outrigger, the sub-frame, the fuel tank, the curved section, the rear frame section, the load receiving recess, the energy absorbing member, the bead, the bulkhead, the front fastening member, the load transmitting member, and the transmitting projection described above are not limited to those described in the embodiment and may be modified as appropriate.

The present application can be applied, for example, to a motor vehicle provided with a vehicle rear structure in which a rear frame extends from a floor frame and in which a sub-frame is mounted from below to the rear frame. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle rear structure comprising:
   a floor frame extending in a longitudinal direction of a vehicle;
   a rear frame extending rearward from the floor frame;
   a side sill provided on an outer side in a vehicle-width direction of the floor frame, the side sill being joined to the rear frame via an outrigger; and
   a sub-frame mounted to the rear frame from below such that the sub-frame is disposed under the rear frame,
   wherein the sub-frame includes a load transmitting member opposite to the outrigger such that an impact load applied to the sub-frame is transmitted to the outrigger via the load transmitting member and the transmitted impact load is distributed to the rear frame and the side sill via the outrigger.

2. The vehicle rear structure according to claim 1,
   wherein the rear frame includes a curved section including a front inclined portion inclined downward toward front,
   the outrigger extends downward from a lower portion of the front inclined portion of the rear frame so as to oppose the load transmitting member and extends in the vehicle-width direction from the lower portion of the front inclined portion to the side sill.

3. The vehicle rear structure according to claim 1,
   wherein the outrigger has a bulkhead provided thereinside, the bulkhead being a partition wall.

4. The vehicle rear structure according to claim 3,
   wherein the bulkhead is disposed between the rear frame and the side sill.

5. The vehicle rear structure according to claim 1,
   wherein the sub-frame is provided at a front end thereof with at least two fastening members arranged along the longitudinal direction of the vehicle; and
   wherein the two fastening members are fastened to the rear frame.

6. The vehicle rear structure according to claim 1,
   wherein the rear frame is provided at a rear portion thereof with an energy absorbing member; and
   wherein the energy absorbing member includes a bead that extends perpendicularly to the longitudinal direction of the rear portion of the rear frame.

7. The vehicle rear structure according to claim 5,
   wherein, the rear frame and the fastening members of the sub-frame are disposed on an extension line of the floor frame; and
   wherein the load transmitting member is provided on the front side of the fastening member and projects to the outer side of the fastening member along the outrigger.

8. The vehicle rear structure according to claim 2,
   wherein the outrigger extends downward from the lower portion of the front inclined portion of the curved section such that the front inclined portion and the outrigger constitute a load receiving recess; and
   wherein the load transmitting member includes a transmitting projection fitted into the load receiving recess.

9. The vehicle rear structure according to claim 1,
   wherein the rear frame includes a upward curved section at an intermediate position thereof in the longitudinal direction, and
   the sub-frame includes a front end contacting a front end portion of the upward curved section and a rear end contacting a rear end portion of the upward curved section such that the sub-frame connects the front end portion to the rear end portion.

10. The vehicle rear structure according to claim 2,
    wherein the outrigger extends downward from a bottom wall of the front inclined portion.

11. The vehicle rear structure according to claim 1,
    wherein the load transmitting member includes a front wall abutting a rear wall of the outrigger.

12. The vehicle rear structure according to claim 11,
    wherein the front wall and the rear wall extend in the vehicle-width direction.

13. A vehicle comprising the vehicle rear structure according to claim 1.

14. The vehicle rear structure according to claim 1, wherein the sub-frame is attached to a bottom side of the rear frame.

15. A vehicle rear structure comprising:
a floor frame extending in a longitudinal direction of a vehicle;
a rear frame extending rearward from the floor frame;
a side sill provided on an outer side in a vehicle-width direction of the floor frame, the side sill being joined to the rear frame via an outrigger; and
a sub-frame mounted to the rear frame from below,
wherein the sub-frame includes a load transmitting member opposite to the outrigger such that an impact load applied to the sub-frame is transmitted to the outrigger via the load transmitting member and the transmitted impact load is distributed to the rear frame and the side sill via the outrigger,
wherein the rear frame includes a curved section including a front inclined portion inclined downward toward front,
the outrigger extends downward from a lower portion of the front inclined portion of the rear frame so as to oppose the load transmitting member and extends in the vehicle-width direction from the lower portion of the front inclined portion to the side sill.

16. The vehicle rear structure according to claim 15, wherein the outrigger extends downward from the lower portion of the front inclined portion of the curved section such that the front inclined portion and the outrigger constitute a load receiving recess; and wherein the load transmitting member includes a transmitting projection fitted into the load receiving recess.

17. The vehicle rear structure according to claim 15, wherein the outrigger extends downward from a bottom wall of the front inclined portion.

18. A vehicle rear structure comprising:
a floor frame extending in a longitudinal direction of a vehicle;
a rear frame extending rearward from the floor frame;
a side sill provided on an outer side in a vehicle-width direction of the floor frame, the side sill being joined to the rear frame via an outrigger; and
a sub-frame mounted to the rear frame from below,
wherein the sub-frame includes a load transmitting member opposite to the outrigger such that an impact load applied to the sub-frame is transmitted to the outrigger via the load transmitting member and the transmitted impact load is distributed to the rear frame and the side sill via the outrigger,
wherein the rear frame includes a upward curved section at an intermediate position thereof in the longitudinal direction, and
the sub-frame includes a front end contacting a front end portion of the upward curved section and a rear end contacting a rear end portion of the upward curved section such that the sub-frame connects the front end portion to the rear end portion.

* * * * *